(12) United States Patent
Lee et al.

(10) Patent No.: US 12,330,729 B2
(45) Date of Patent: Jun. 17, 2025

(54) VEHICLE BODY

(71) Applicants: Hyundai Motor Company, Seoul (KR); Kia Corporation, Seoul (KR)

(72) Inventors: Sang Heon Lee, Seoul (KR); Dong Eun Cha, Hwaseong-Si (KR); Jin Ho Hwang, Cheonan-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 358 days.

(21) Appl. No.: 17/972,334

(22) Filed: Oct. 24, 2022

(65) Prior Publication Data
US 2024/0002003 A1   Jan. 4, 2024

(30) Foreign Application Priority Data
Jul. 1, 2022 (KR) .......................... 10-2022-0081371

(51) Int. Cl.
B62D 63/02 (2006.01)
(52) U.S. Cl.
CPC .................. B62D 63/025 (2013.01)
(58) Field of Classification Search
USPC ......... 296/26.01, 26.02, 26.05, 26.04, 26.06, 296/26.07
See application file for complete search history.

(56) References Cited

U.S. PATENT DOCUMENTS

| | | | | |
|---|---|---|---|---|
| 3,356,410 A | * | 12/1967 | Taylor | B60P 3/34 296/173 |
| 5,028,088 A | * | 7/1991 | Del Monico | B60P 3/34 296/26.04 |
| 5,114,202 A | * | 5/1992 | Johnson | B60P 3/07 296/26.05 |
| 5,129,697 A | * | 7/1992 | Heikkinen | B60P 3/34 296/180.1 |
| 5,135,278 A | * | 8/1992 | Kauffman | B60P 3/34 296/173 |
| 5,374,094 A | * | 12/1994 | Smith | B60P 3/34 296/26.05 |

(Continued)

FOREIGN PATENT DOCUMENTS

| | | |
|---|---|---|
| DE | 102017011996 B3 | 3/2019 |
| JP | 2005-212537 | 8/2005 |

(Continued)

*Primary Examiner* — Amy R Weisberg
*Assistant Examiner* — Veronica M Condo
(74) *Attorney, Agent, or Firm* — Morgan, Lewis & Bockius LLP

(57) ABSTRACT

A vehicle body includes an upper body forming an internal space of the vehicle and to include a door for entry and exit of an occupant provided on a side thereof, a lower body including a floor on which the upper body is located and a bumper unit extending upward along a perimeter of the floor to surround a lower portion of the upper body, wherein the bumper unit includes an opening portion which is provided at a position corresponding to a lower portion of the door of the upper body to be selectively opened, and a driving unit coupling the upper body and the lower body to each other and configured to adjust the height of the internal space by raising and lowering the upper body with respect to the lower body.

15 Claims, 7 Drawing Sheets

(56) References Cited

U.S. PATENT DOCUMENTS

| | | | | |
|---|---|---|---|---|
| 6,126,220 | A * | 10/2000 | Brasher | B62D 33/08 296/26.05 |
| 6,565,143 | B2 * | 5/2003 | Okamoto | B60P 3/341 296/156 |
| 7,758,103 | B1 * | 7/2010 | Steury | B60P 3/34 296/26.05 |
| 2008/0164721 | A1 * | 7/2008 | Semotuk | B60P 3/34 296/165 |
| 2013/0062900 | A1 * | 3/2013 | Bullard | B60P 3/34 296/26.04 |
| 2019/0256005 | A1 * | 8/2019 | Granzotto | B60P 3/34 |

FOREIGN PATENT DOCUMENTS

| | | | |
|---|---|---|---|
| JP | 3112977 U | | 9/2005 |
| KR | 10-2021-0130279 | | 11/2021 |
| KR | 10-2022-0035555 | | 3/2022 |
| KR | 2022035555 A | * | 3/2022 |

* cited by examiner

VEHICLE BODY

CROSS-REFERENCE TO RELATED APPLICATION(S)

The present application claims priority to Korean Patent Application No. 10-2022-0081371, filed on Jul. 1, 2022, the entire contents of which is incorporated herein for all purposes by this reference.

BACKGROUND OF THE PRESENT DISCLOSURE

Field of the Present Disclosure

The present disclosure relates to a vehicle body, and more particularly, to a technology for using the internal space of a vehicle for various purposes by expanding or reducing the internal space of the vehicle.

Description of Related Art

Since the advent of the first internal combustion vehicle in the 1800s, vehicles have been continuously developed. The durability and the stability of vehicles are being improved, and power sources for the vehicles are also changing from fossil fuels to electric batteries or fuel cells. In the future, with the development of autonomous driving technology, new concept vehicles different from the existing vehicles are expected to appear.

However, vehicle purchasers are still purchase and use finished vehicles produced by vehicle manufactures. purchasers should purchase finished vehicles according to purposes, and thus had to purchase finished vehicles depending on the purposes of use. For example, even a person having a driving vehicle had to purchase a cargo vehicle to haul cargo. In particular, it is only possible to purchase a vehicle from among finished vehicles provided by a manufacturer, and a vehicle, having a body capable of being actively configured according to preference or the purpose of use, has not yet been developed.

A vehicle may be used for various purposes including transportation. Therefore, recently, there has been a demand for a vehicle having an expandable body structure to be used for the various purposes.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle body which includes an upper body and a lower body coupled to each other, and includes a driving unit of moving the upper body up and down, wherein the driving unit operates to move the upper body up and down as necessary to expand or reduce the internal space of a vehicle.

A vehicle body according to an exemplary embodiment of the present disclosure may include: an upper body forming an internal space of the vehicle and including a door for entry and exit of an occupant provided on a side thereof; a lower body including a floor on which the upper body is located and a bumper unit extending upward along a perimeter of the floor to surround a lower portion of the upper body, the bumper unit including an opening portion which is provided at a position corresponding to a lower portion of the door of the upper body to be selectively opened; and a driving unit coupling the upper body and the lower body to each other and configured to adjust a height of the internal space by raising or lowering the upper body with reference to the lower body.

The vehicle body may further include a sealing portion coupled to the upper end portion of the bumper unit to seal a gap between the upper body and the lower body.

Sealing portions may be provided at the upper end portion of the bumper unit and at upper end portions of the bumper unit and the opening portion while being separated from each other.

The driving unit may include a lead screw coupled to the floor to be connected to a rotation shaft of a driving motor and extending upward, and a nut coupled to the lower portion of the upper body and meshed with the lead screw, and the upper body may be raised and lowered according to the rotation of the lead screw.

The driving unit may include a hydraulic device connecting the floor and the upper body, and the upper body may be moved in a vertical direction according to operation of the hydraulic device.

The driving unit including a wheel, a driving motor, and a battery may be coupled to a lower portion of the lower body.

The vehicle body may include a plurality of driving units disposed on an edge portion of the floor of the lower body and an edge portion of the upper body to connect the upper body and the lower body.

The plurality of driving units may be respectively provided at corner points of the floor of the lower body and corner points of the upper body to connect the upper body and the lower body.

The opening portion may be connected by a hinge portion provided on first and second sides at the lower end portion of the bumper unit, and may be opened while being rotated downward with respect to the hinge portion.

The opening portion may be brought into contact with the ground to be rotated to the outside of the vehicle and inclined.

The door of the upper body and the opening portion of the lower body area may be disposed on left and right sides of the vehicle.

The vehicle body may further include a control unit configured to control the operation of the door, the opening portion, and the driving unit according to the driving of the vehicle.

The control unit may control the door of the upper body to be opened only when the driving of the vehicle is stopped and when the opening portion of the lower body is opened.

The control unit may operate the driving unit to raise the upper body when the driving of the vehicle is stopped, and may operate the driving unit to lower the upper body when the vehicle is being driven.

The upper may be disposed to be inserted in the bumper unit of the lower body, and the upper body and the lower body may be connected to each other by the driving unit.

The vehicle body according to an exemplary embodiment of the present disclosure may include: an upper body provided with a door; a lower body provided with a bumper unit covering the lower portion of the upper body; and a driving unit connecting the upper body to the lower body and moving the upper body up and down, whereby the bumper unit of the lower body may protect the lower portion of the upper body when the upper body moves down, and when the upper body of a vehicle moves up and down, the bumper unit of the lower body may cover a space to expand the interior of the vehicle.

Furthermore, the bumper unit of the lower body may include an opening portion provided to be opened at a position corresponding to the door of the upper body, and thus the opening portion and the door may be opened regardless of the position of the upper body so that passengers can conveniently board and alight from the vehicle.

The bumper unit may be disposed to extend upwards from the lower body to cover the lower portion of the upper body.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
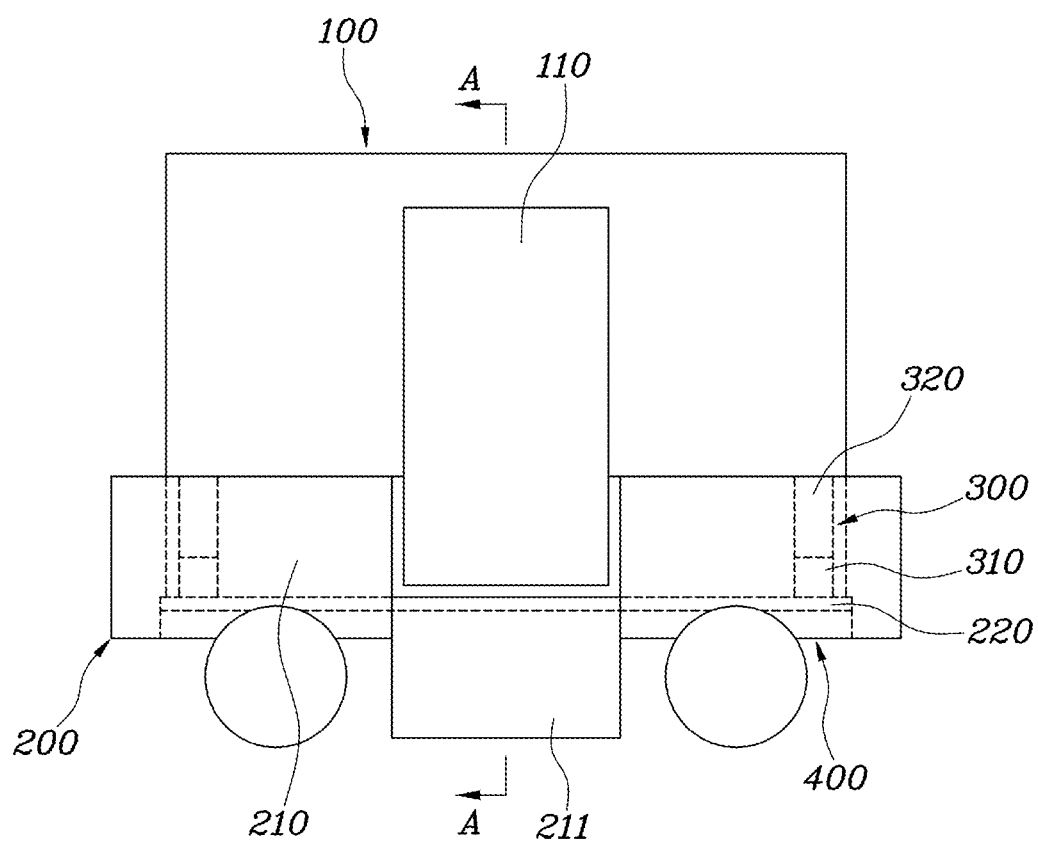
FIG. 1 is a side view showing a state in which an upper body included in a vehicle body is lowered according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments included in the present specification will be described in detail with reference to the accompanying drawings, and the same or similar elements are provided the same and similar reference numerals, so duplicate descriptions thereof will be omitted.

The terms "module" and "unit" used for the elements in the following description are provided or interchangeably used in consideration of only the ease of writing the specification, and do not have distinct meanings or roles by themselves.

In relation to describing the exemplary embodiments disclosed in the present specification, when the detailed description of the relevant known technology is determined to unnecessarily obscure the gist of the present disclosure, the detailed description may be omitted. Furthermore, the accompanying drawings are provided only for easy understanding of the exemplary embodiments disclosed in the present specification, and the technical spirit disclosed herein is not limited to the accompanying drawings, and it should be understood that all changes, equivalents, or substitutes thereof are included in the spirit and scope of the present disclosure.

In the case where an element is referred to as being "connected" or "coupled" to any other element, it should be understood that another element may be provided therebetween, as well as that the element may be directly connected or coupled to the other element. In contrast, in the case where an element is "directly connected" or "directly coupled" to any other element, it should be understood that no other element is present therebetween.

A singular expression may include a plural expression unless they are definitely different in a context.

As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

Figure 2:
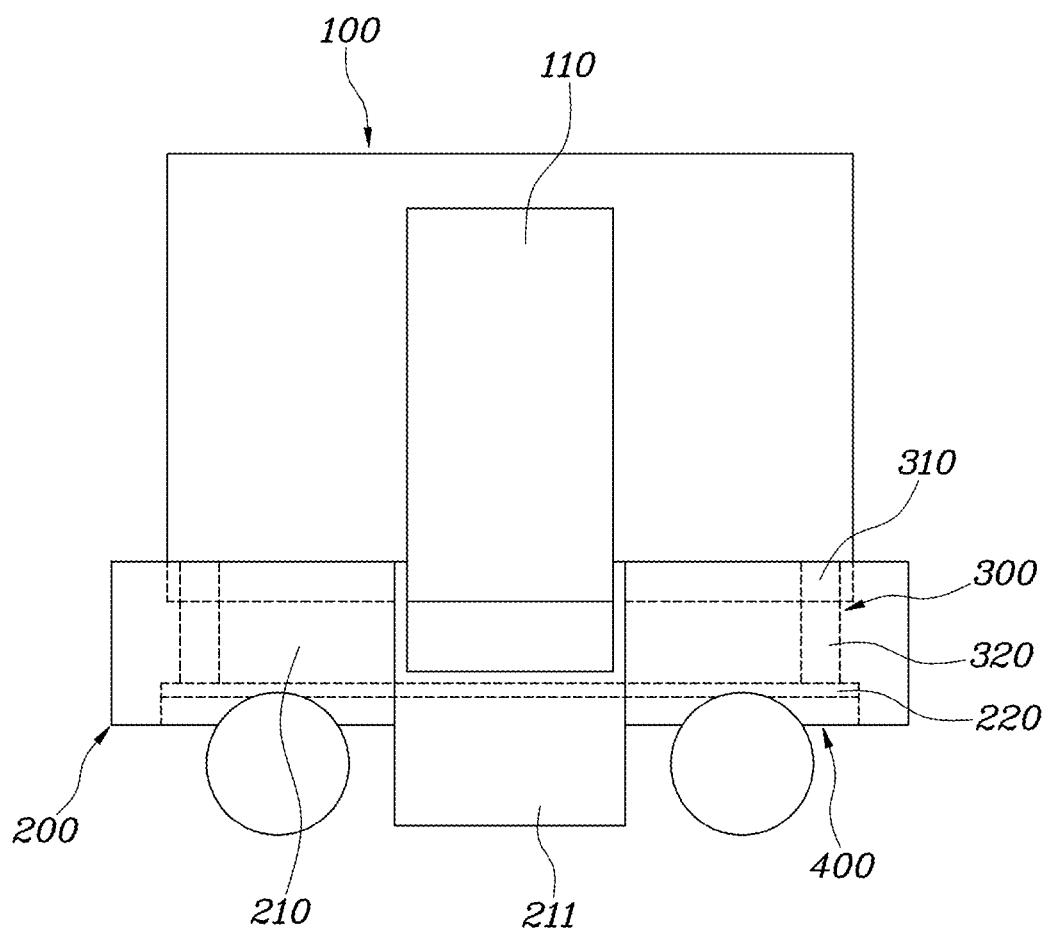
FIG. 2 is a side view showing a state in which an upper body included in a vehicle body is raised and lowered according to an exemplary embodiment of the present disclosure.
Figure 3:
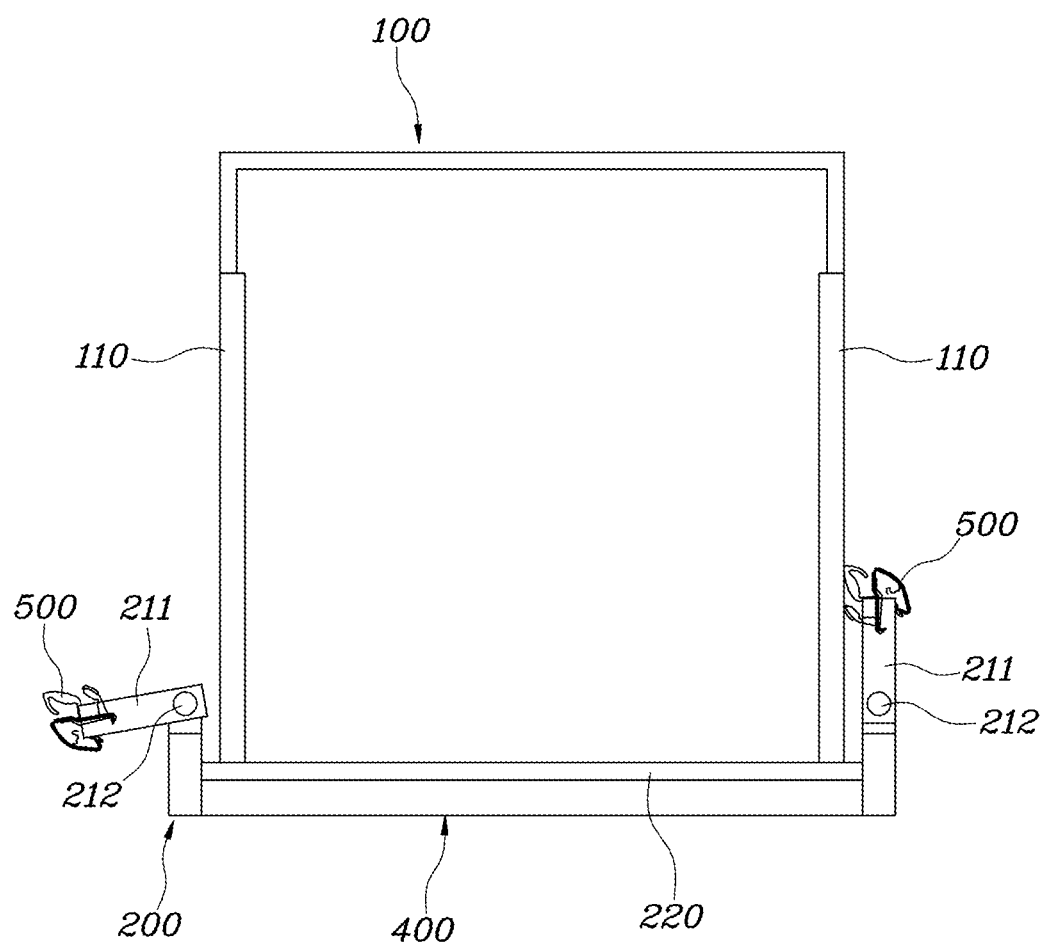
FIG. 3 is a cross-sectional view taken along line A-A of FIG. 1.
Figure 4:
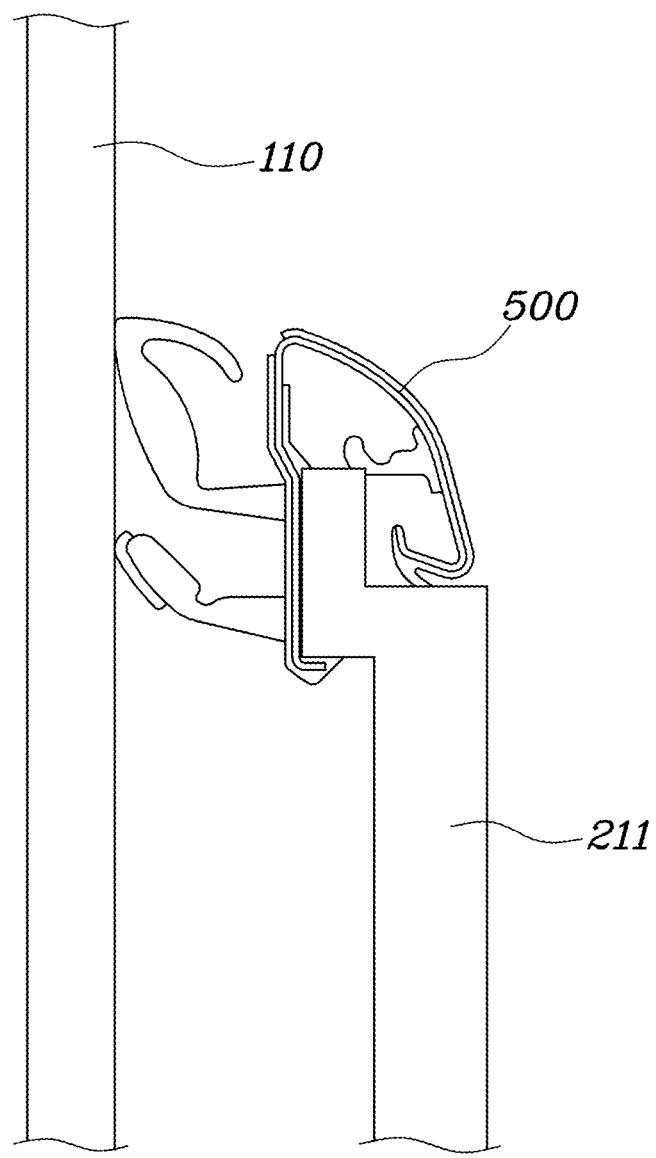
FIG. 4 is an enlarged view of FIG. 3.
Figure 5:
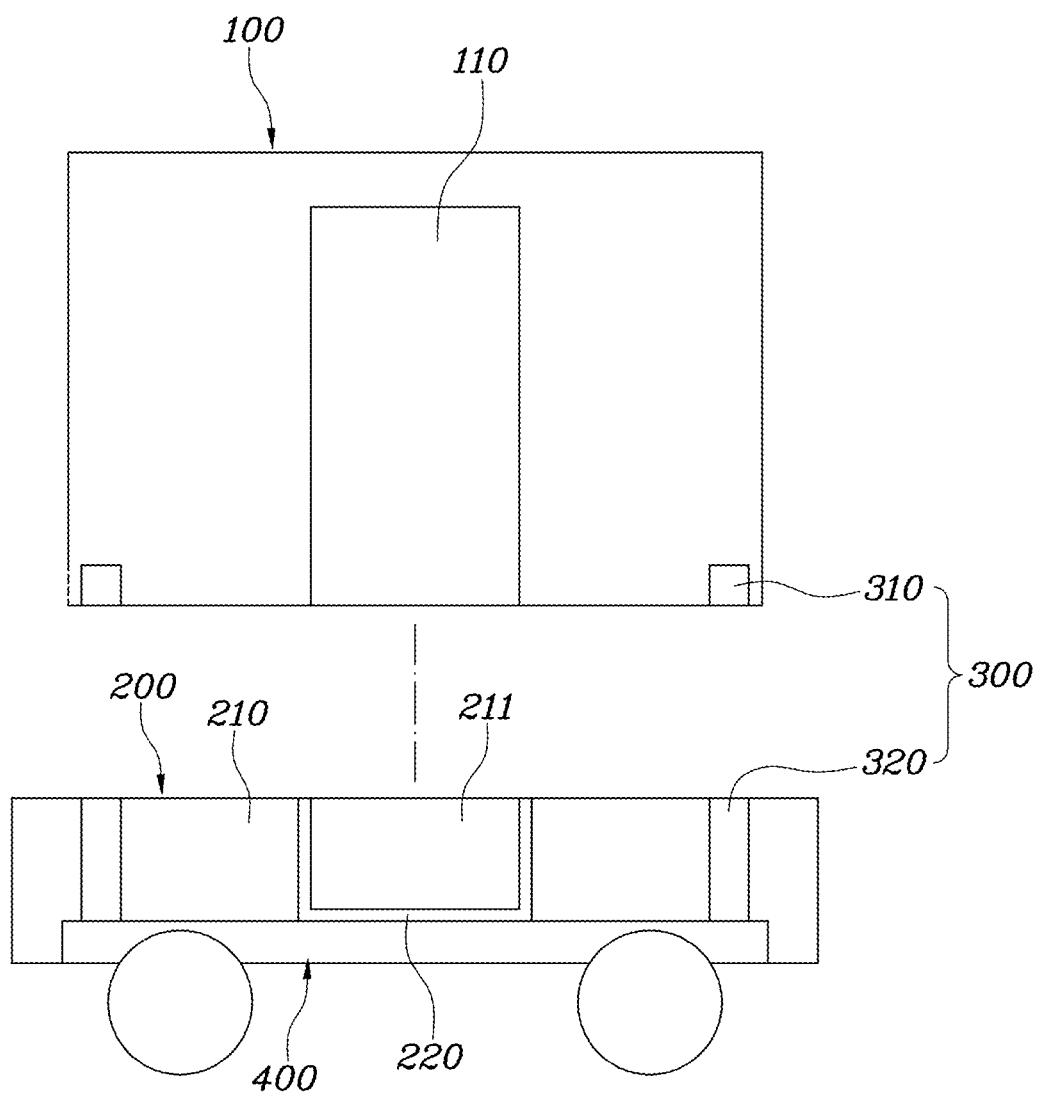
FIG. 5 is a side view showing that a state in which an upper body and a lower body included in a vehicle body are coupled to each other according to an exemplary embodiment of the present disclosure.
Figure 6:
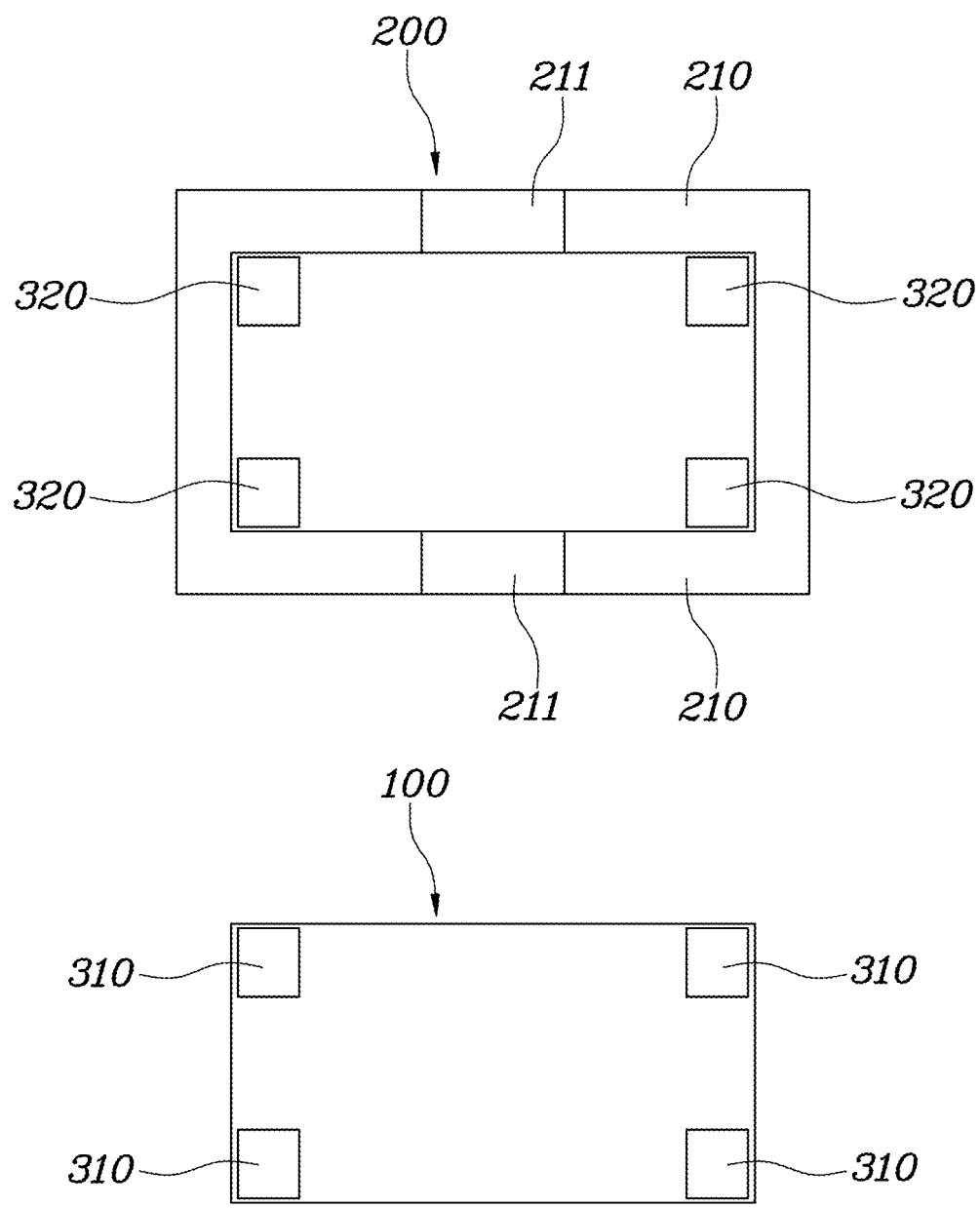
FIG. 6 is a top view showing an upper body and a lower body included in a vehicle body according to an exemplary embodiment of the present disclosure.

FIG. 1 is a side view showing a state in which an upper body 100 included in a vehicle body is lowered according to an exemplary embodiment of the present disclosure, FIG. 2 is a side view showing a state in which the upper body 100 included in a vehicle body is raised and lowered according to an exemplary embodiment of the present disclosure, FIG. 3 is a cross-sectional view taken along line A-A of FIG. 1, FIG. 4 is an enlarged view of FIG. 3, FIG. 5 is a side view showing that a state in which the upper body 100 and a lower body 200 included in a vehicle body are coupled to each other according to an exemplary embodiment of the present disclosure, and FIG. 6 is a top view showing the upper body 100 and the lower body 200 included in a vehicle body according to an exemplary embodiment of the present disclosure.

An exemplary embodiment of a vehicle body according to the present disclosure will be described with reference to FIGS. 1 to 6.

Recently, a vehicle is parked and combined with a building to be used as a multi-purpose vehicle so that the interior of the vehicle is used as a residential space or used for various purposes.

A vehicle used for the present purpose needs to have a tall body design so that passengers can move comfortably inside the vehicle.

However, when the vehicle body is designed to be high, there is a problem in that an air resistance value is increased, so that the fuel economy or the electric economy is lowered when the vehicle is running.

To solve the present problem, according to the present disclosure, when the vehicle is driven, the vehicle body is kept short, and when the vehicle is parked or stopped, the vehicle height is raised to expand the internal space so that passengers can more utilize the interior of the vehicle.

A vehicle body according to the present disclosure may include an upper body 100 configured to form an internal space of the vehicle and to include a door 110 for entry and exit of an occupant provided on a side thereof; a lower body 200 including a floor 220 on which the upper body 100 is located and a bumper unit 210 extending upward along a perimeter of the floor 220 to surround a lower portion of the upper body 100, wherein the bumper unit 210 includes an opening portion 211 which is provided at a position corresponding to a lower portion of the door 110 of the upper body 100 to be selectively opened; and a driving unit 300 configured to connect the upper body 100 and the lower body 200 to each other and adjust the height of the internal space by raising and lowering the upper body 100 with respect to the lower body 200.

As shown in FIGS. 1 to 2, the upper body 100 may include a roof, a front surface, a rear surface, and both side surfaces to surround the outside of the vehicle, and the door 110 may be provided on the upper body 100 so that the door 110 is disposed on the front surface, rear surface, and both side surfaces of the vehicle to be opened or closed so that passengers can get on or off the vehicle.

The door 110 may be provided on the upper body 100 in a sliding method or a swing method, and may be adopted according to the convenience of a designer or the design of the vehicle.

The lower body 200 may include the floor 220 that passengers can board, and the bumper unit 210 that extends upwards from the edge portion of the floor 220 to surround the lower portion of the upper body 100, and the bumper unit 210 may include the opening portion 211 provided at a position corresponding to the door 110 of the upper body 100 to be separated from the bumper unit 210 and opened and closed.

In general, the opening portion may be formed in a form of a ramp and may be formed to be opened outwardly from the bumper unit 210.

In a state in which the upper body 100 is lowered and the bumper unit 210 and the upper body 100 overlap each other, the opening portion 211 may be opened and the door 110 may be opened, so that passengers can get on or off the vehicle.

Furthermore, as the bumper unit 210 is formed to surround the lower portion of the upper body 100, the bumper unit 210 may absorb external shocks in the event of a vehicle collision to protect the upper body 100 and passengers riding in the interior of the vehicle.

The driving unit 300 may be coupled to connect the floor 220 of the lower body 200 and the upper body 100 to each other, and may be operated to raise and lower the upper body 100 during operation. At the instant time, the driving unit 300 may raise and lower the upper body 100 in the vertical direction as much as a height at which the bumper unit 210 included in the lower body 200 extends upwards.

Through this, the driving unit 300 may raise the upper body 100 upward to expand the internal space of the vehicle, so that the interior of the vehicle may be used for various purposes. Furthermore, as the driving unit 300 lowers the upper body 100 downward, the overall height of the vehicle may be lowered, reducing air resistance generated when the vehicle is driving, and improving driving stability of the vehicle due to the lowered vehicle body.

Furthermore, when the upper body 100 moves upward, the bumper unit 210 may cover the space separated from the floor 220, preventing the internal space of the vehicle from being exposed to the outside. Therefore, the driving unit 300 may freely raise and lower the upper body 100 of the vehicle.

A sealing portion 500 configured to be coupled to the upper end portion of the bumper unit 210 to seal between the upper body 100 and the lower body 200 may be further included.

As shown in FIG. 3 and FIG. 4, a gap may be formed between the upper body 100 and the bumper unit 210, so that snow, rain, or dust from the outside penetrates into the interior of the vehicle whereby a mechanical device such as the vehicle's electronic equipment or the driving unit 300 may fail.

To solve the present problem, the sealing portion 500 for sealing between the upper body 100 and the bumper unit 210 may be disposed on the upper end portion of the bumper unit 210 as shown in FIG. 4.

The sealing portion 500 coupled to the upper end portion of the bumper unit 210 may be made of an elastic material including rubber, and may be provided to apply an elastic force from the upper end portion of the bumper unit 210 toward the upper body 100 so that, even when the upper body 100 moves in the vertical direction, there is an effect of preventing foreign substances from penetrating between the upper body 100 and the bumper unit 210.

The sealing portions 500 may be provided to be separated from each other at the upper end portion of the bumper unit 210 and at the upper end portion of the bumper unit 210 and the opening portion 211.

The opening portion 211 may become a portion of the bumper unit 210 when closed, and may cover the lower portion of the door 110 of the upper body 100, and may be first opened before the door 110 of the upper body 100 is opened so that the opening portion 211 may be separated from the bumper unit 210. Accordingly, the sealing portion 500 coupled to the upper end portion of the bumper unit 210 may be separated from a parting line where the opening portion 211 is separated from the bumper unit 210, and may be divided into a plurality of portions to be coupled to the upper end portion of the opening portion 211 when the opening portion 211 is opened, so that it is possible to completely seal between the door 110 and the opening portion 211 of the upper body 100 when the opening portion 211 is closed.

The driving unit 300 may include a motor coupled to the floor 220 to rotate a rotation shaft, a lead screw 320 connected to the rotation shaft of the motor and extending upward, and a nut 310 coupled to the lower end portion of the upper body 100 and meshed with the lead screw 320, and the upper body 100 may be raised and lowered according to the rotation of the lead screw 320.

As a fist exemplary embodiment of the driving unit 300, the motor and the lead screw 320 may be coupled to the floor 220 of the lower body 200 and the nut 310 may be coupled to the upper body 100, so that the nut 310 connected to the lead screw may be moved in the vertical direction when the motor rotates the lead screw 320. Due to the provided configuration, the upper body 100 may be raised and lowered.

In the first exemplary embodiment of the driving unit 300, the nut 310 may be moved in the vertical direction according to the rotation of the lead screw 320 to raise and lower the upper body 100, so that there is little failure of the driving unit 300 and the cost may be reduced.

The driving unit 300 may include a hydraulic device connecting the floor 220 and the upper body 100, and the upper body 100 may be moved in the vertical direction according to the operation of the hydraulic device.

As a second exemplary embodiment of the driving unit 300, a hydraulic device extending in the longitudinal direction may be provided. Here, one end portion of the hydraulic device may be coupled to the floor 220 and the other end portion thereof may be coupled to the upper body 100, so that the upper body 100 may be raised when the length of the hydraulic device is extended and the upper body 100 may be lowered when the length of the hydraulic device is reduced.

In the second exemplary embodiment of the driving unit 300, as compared to the first exemplary embodiment of the present disclosure, the upper body 100 may be smoothly raised and lowered.

The driving unit 400 including a vehicle wheel, a driving motor, and a battery may be coupled to the lower portion of the lower body 200.

As shown in FIG. 1, the driving unit 400 for moving the vehicle may be coupled to the lower portion of the lower body 200, and as the driving unit 400 and the lower body 200 may be manufactured separately and combined, various types of driving units 400 may be coupled to the lower body 200 so that the driving unit 400 may be changed according to various requirements of consumers, improving the merchantability of the vehicle.

In the case of an electric vehicle, the driving unit 400 may include a wheel, a steering device, a driving motor, and a battery, and in the case of an internal combustion engine, the driving unit 400 may include an engine, a transmission, and a fuel tank in place of the driving motor and the battery.

A plurality of driving units 300 may be disposed on the edge portion of the floor 220 of the lower body 200 and the edge portion of the upper body 100 to connect the upper body 100 and the lower body 200.

As shown in FIG. 6, the plurality of driving units 300 may be disposed and operated on the edge portion of the floor 220 and the edge portion of the upper body 100 to raise and lower the upper body 100.

Through this, it is possible to secure the internal space of the vehicle as much as possible, and as a plurality of driving units may be provided, there is an effect of preventing the upper body 100 from tilting to one side when the upper body 100 is raised and lowered.

The plurality of driving units 300 may be respectively provided at corner points of the floor 220 of the lower body 200 and corner points of the upper body 100 to connect the upper body 100 and the lower body 200.

As shown in FIG. 6, the plurality of driving units 300 may be disposed to correspond to the corner portions of the floor 220 of the lower body 200 and the corner portions of the upper body 100 to connect the upper body 100 and the lower body 200.

Through this, when the driving unit 300 is operated, the upper body 100 may be constantly raised and lowered.

The opening portion 211 may be connected by hinge portions 212 provided on both sides at the lower end portion of the bumper unit 210, and may be opened while being rotated downward with respect to the hinge portion 212.

As shown in FIGS. 1 to 2, the opening portion 211 provided in the bumper unit 210 of the lower body 200 may be integrally formed with the bumper unit 210 when closed, and the hinge portion 212 connecting the lower end portion of the side surface of the opening portion 211 and the bumper unit 210 may be provided, so that the opening portion 211 may be opened while being rotated downward with respect to the hinge portion 212 when the opening portion 211 is opened to the outside of the vehicle.

Through this, the door 110 of the vehicle may be applied as a swing door 110 and may be freely opened without interfering with the opening portion 211 when the door 110 is opened to, the, the outside thereof, and the opening 211 may be opened downward so that passengers can conveniently board the vehicle.

The opening portion 211 may be brought into contact with the ground to be rotated to the outside of the vehicle and inclined.

As shown in FIGS. 1 to 2, the lower end portion of the opening portion 211 which is rotated and opened may be brought into contact with the ground, and the opening portion 211 may be provided to form an inclination from the ground to the floor 220 side thereof.

Through this, there is an effect that a passenger can easily board the vehicle through the inclined surface formed by the opening portion 211 when boarding, or an object may be easily loaded through the inclined surface when the object is loaded on the vehicle.

The door 110 of the upper body 100 and the opening portion 211 of the lower body 200 may be disposed on left and right side surfaces of the vehicle.

As shown in FIG. 3, the plurality of doors 110 and opening portions 211 may be disposed on the side surface of the vehicle, and may be disposed on the side surface of the vehicle to make it easier for passengers to get on or off the vehicle. Here, the number and positions of the doors 100 may be changed according to the purpose of use of the vehicle.

Figure 7:
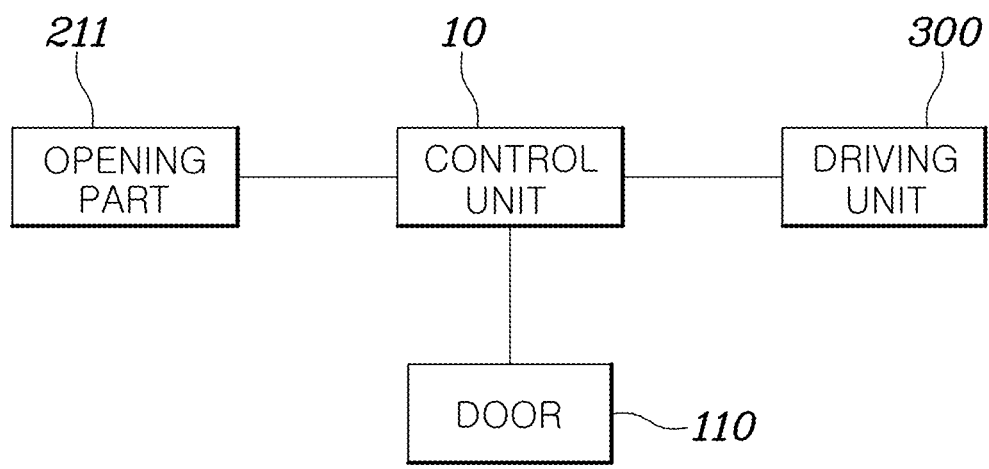
FIG. 7 is a schematic diagram showing a vehicle body according to an exemplary embodiment of the present disclosure.

FIG. 7 is a schematic diagram showing a vehicle body according to an exemplary embodiment of the present disclosure.

The vehicle body may further include a control unit 10 configured to control the operation of the door 110, the opening portion 211, and the driving unit 300 according to the driving of the vehicle.

As shown in FIG. 7, the control unit 10 connected to the driving unit 400 of the vehicle may be connected to the locking devices of the door 110 and the opening portion 211, and the driving unit 300 to control the opening and closing of the door 110 and the opening portion 211, or may control the operation of the driving unit 300 to improve the convenience of passengers and the merchantability of the vehicle. Furthermore, the control unit 10 may control the operation of the door 110, the opening portion 211, and the driving unit 300 to increase the driving efficiency of the vehicle and improve the electric economy, and may control the operation of the door 110 and the opening portion 211 to prevent vehicle damage.

An example of operation control of the door 110, the opening portion 211, and the driving unit 300 of the control unit 10 is as follows.

The control unit 10 may control the door 110 of the upper body 100 to be opened only when the driving of the vehicle is stopped and the opening portion 211 of the lower body 200 is opened.

When the passenger opens the door 110 provided in the upper body 100, the control unit 10 may control the opening of the door 110 so that the door 110 may be opened after the opening portion 211 of the lower body 200 is first opened.

A signal may be identified when the passenger operates a handle to open the door 110 inside the vehicle, the opening portion 211 may be first opened by controlling the opening and closing of the opening portion 211, and then the door 110 may be controlled to be opened, so that it is possible to prevent one or more of the opening portion 211 and the door 110 from being damaged by colliding with each other.

Furthermore, the control unit 10 may allow the door 110 and the opening portion 211 not to be opened when the driving unit 400 of the vehicle is operated and driven, and to be opened only when the vehicle is stopped, whereby it is possible to preventing accidents when passengers get on or off the vehicle.

The control unit 10 may operate the driving unit 300 to raise and lower the upper body 100 when the driving of the vehicle is stopped, and may operate the driving unit 300 to lower the upper body 100 when the vehicle is being driven.

When the vehicle is running, the higher the vehicle's overall height, the greater the air resistance, and thus the fuel economy or electric economy of the vehicle may be reduced. Furthermore, there is no reason to raise and lower the upper body 100 as the passenger rides on the seat of the vehicle while driving of the vehicle.

Therefore, to solve the present problem, the control unit 10 may lower the upper body 100 when the vehicle is being driven to improve fuel economy or electric economy of the vehicle, and may raise the upper body 100 when the vehicle is stopped to allow passengers to utilize the expanded internal space of the vehicle for various purposes.

The upper body 100 may be inserted and disposed inside the bumper unit 210 of the lower body 200, and the upper body 100 and the lower body 200 may be connected to each other by the driving unit 300.

As shown in FIG. 6, when the upper body and the lower body 200 are assembled, the upper body 100 and the lower body 200 may be mounted in a form in which the upper body 100 is inserted from the upper side toward the lower body 200 side thereof.

Through this, the bumper unit 210 of the lower body 200 may allow the upper body 100 to protect the lower portion of the upper body 100 when the upper body 100 is lowered, and the bumper unit 210 of the lower body 200 may cover a separation space when the upper body 100 of the vehicle is raised.

Furthermore, the assembly of the upper body 100 and the lower body 200 and the coupling of the driving unit 300 may be easily performed, and the upper body 100 or the lower body 200 may be easily replaced according to the needs of the customer.

In addition, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method disclosed in the aforementioned various exemplary embodiments of the present invention.

The aforementioned invention can also be embodied as computer readable codes on a computer readable recording medium. The computer readable recording medium is any data storage device that can store data which can be thereafter read by a computer system and store and execute program instructions which can be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet). Examples of the program instruction include machine language code such as those generated by a compiler, as well as high-level language code that may be executed by a computer using an interpreter or the like.

In an exemplary embodiment of the present invention, each operation described above may be performed by a control device, and the control device may be configured by multiple control devices, or an integrated single control device.

In an exemplary embodiment of the present invention, the control device may be implemented in a form of hardware or software, or may be implemented in a combination of hardware and software.

In addition, the terms such as "unit", "module", etc. disclosed in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle body comprising:
an upper body forming an internal space of a vehicle and including a door for entry and exit of an occupant provided on a side thereof;
a lower body, including a floor, on which the upper body is located and a bumper unit extending upward along a perimeter of the floor to surround a lower portion of the upper body, the bumper unit including an opening portion which is provided at a position corresponding to a lower portion of the door of the upper body to be selectively opened; and
a driving unit coupling the upper body and the lower body to each other and configured to adjust a height of the internal space by raising or lowering the upper body with reference to the lower body.

2. The vehicle body of claim 1, further including a sealing portion coupled to an upper end portion of the bumper unit to seal a gap between the upper body and the lower body.

3. The vehicle body of claim 2, wherein sealing portions are provided at opposing end portions of the opening portion, respectively, and are separable from the opposing end portions of the opening portion.

4. The vehicle body of claim 1, wherein the driving unit includes a lead screw coupled to the floor to be connected to a rotation shaft of a driving motor and extending upward, and a nut coupled to the lower portion of the upper body and meshed with the lead screw, and the upper body is raised or lowered according to rotation of the lead screw.

5. The vehicle body of claim 1, further comprising a vehicle driving unit, wherein the vehicle driving unit includes a wheel, a driving motor, and a battery, and is coupled to a lower portion of the lower body.

6. The vehicle body of claim 1, wherein a plurality of driving units are disposed on an edge portion of the floor of the lower body and an edge portion of the upper body to connect the upper body and the lower body.

7. The vehicle body of claim 6, wherein the plurality of driving units are respectively provided at corner points of the floor of the lower body and corner points of the upper body to connect the upper body and the lower body.

8. The vehicle body of claim 1, wherein the opening portion is connected by a hinge portion provided on opposing sides of the vehicle at a lower end portion of the bumper unit, and is opened while being rotated downward with respect to the hinge portion.

9. The vehicle body of claim 8, wherein the opening portion is brought into contact with the ground to be rotated to an outside of the vehicle and inclined.

10. The vehicle body of claim 1, wherein the door of the upper body and the opening portion of the lower body are disposed on left and right sides of the vehicle.

11. The vehicle body of claim 1, further including a control unit configured to control operation of the door, the opening portion, and the driving unit according to driving of the vehicle.

12. The vehicle body of claim 11, wherein the control unit is configured to control the door of the upper body to be opened only when driving of the vehicle is stopped and when the opening portion of the lower body is opened.

13. The vehicle body of claim 11, wherein the control unit is configured to operate the driving unit to raise the upper body when driving of the vehicle is stopped, and operates the driving unit to lower the upper body when the vehicle is being driven.

14. The vehicle body of claim 1, wherein the upper body is disposed to be inserted in the bumper unit of the lower body, and the upper body and the lower body are connected to each other by the driving unit.

15. The vehicle body of claim 1, wherein the bumper unit extends upwards from the lower body and is provided to surround the lower portion of the upper body.

* * * * *